United States Patent [19]
Burns, Sr. et al.

[11] Patent Number: 5,975,801
[45] Date of Patent: Nov. 2, 1999

[54] PROCESS FOR PRODUCING A PRODUCT FOR USE AS AN ALTERNATIVE COVER MATERIAL FOR LANDFILLS AND SYSTEMS

[76] Inventors: Richard S. Burns, Sr., 8321 New Second St., Elkins Park, Pa. 19117; Allen T. Burns, 944 Oakmont St., Philadelphia, Pa. 19111; Richard S. Burns, Jr., 2843 Nestling Rd., Philadelphia, Pa. 19154

[21] Appl. No.: 08/993,903

[22] Filed: Dec. 18, 1997

[51] Int. Cl.⁶ .......................... B02C 15/00; C04B 18/06
[52] U.S. Cl. .......................... 405/129; 241/24.1; 241/28; 241/DIG. 38; 405/128
[58] Field of Search .................. 405/129, 128; 241/DIG. 38, 20, 41, 23, 24.1, 28, 24.12, 43, 29

[56] References Cited

U.S. PATENT DOCUMENTS

| | | |
|---|---|---|
| 2,015,361 | 9/1935 | Holland . |
| 3,113,014 | 12/1963 | Foth . |
| 3,614,867 | 10/1971 | Nieman . |
| 3,635,409 | 1/1972 | Brewer . |
| 3,705,851 | 12/1972 | Brauer . |
| 3,727,846 | 4/1973 | Rader . |
| 3,826,437 | 7/1974 | Warren, Jr. et al. . |
| 4,099,678 | 7/1978 | Brewer . |
| 4,483,641 | 11/1984 | Stoll . |
| 4,519,338 | 5/1985 | Kramer et al. . |
| 4,793,927 | 12/1988 | Meehan et al. . |
| 4,813,618 | 3/1989 | Cullom . |
| 4,834,300 | 5/1989 | Wojciechowski et al. . |
| 4,877,531 | 10/1989 | Burkett . |
| 4,909,667 | 3/1990 | DeMello . |
| 4,927,317 | 5/1990 | Acosta . |
| 4,973,196 | 11/1990 | Fuhr et al. . |
| 5,024,770 | 6/1991 | Boyd et al. . |
| 5,026,208 | 6/1991 | Beyer et al. . |
| 5,040,920 | 8/1991 | Forrester . |
| 5,048,764 | 9/1991 | Flament . |
| 5,051,031 | 9/1991 | Schumacher et al. . |
| 5,054,406 | 10/1991 | Judd . |
| 5,054,962 | 10/1991 | Bahnmüller et al. . |
| 5,090,843 | 2/1992 | Grigsby . |
| 5,143,481 | 9/1992 | Schumacher et al. . |
| 5,152,467 | 10/1992 | Hwang . |
| 5,181,803 | 1/1993 | Smith et al. . |
| 5,246,310 | 9/1993 | Prange et al. . |
| 5,288,170 | 2/1994 | Cummings .............................. 405/129 |

(List continued on next page.)

OTHER PUBLICATIONS

"Rotor–Grind" brochure of Del Zotto Manufacturing, Inc. dated Jan. 1, 1991.

*Primary Examiner*—Dennis L. Taylor
*Attorney, Agent, or Firm*—Akin, Gump, Strauss, Hauer & Feld, L.L.P.

[57] ABSTRACT

A process for producing a product for use as an alternative cover material for landfills using recycled materials is provided. The process includes: receiving construction and demolition debris in a first area; receiving clean fill in a second area; positive sorting at least one of masonry products, concrete, bricks, cinder block, rocks, and asphalt from the construction and demolition debris; positive sorting a remaining portion of the construction and demolition debris to remove recyclable materials including at least one of cardboard, wood, fiber, ferrous metal and non-ferrous metal; negative sorting a remainder of the construction and demolition debris to remove materials other than wood, roofing material, plaster, plaster board and insulating board to form a first feed stock component; grinding the first feed stock component to a desired particle size of up to approximately six inches to form a first feed stock; mixing the at least one of the masonry products, concrete, bricks, cinder block, rocks and asphalt with the clean fill to form a second feed stock component; grinding the second feed stock component to a desired particle size of up to approximately six inches to form a second feed stock; and blending the first and second feed stocks in a proportion of approximately 2:1 to approximately 5:1 by weight to form an alternative cover material for landfills using recycled material.

13 Claims, 3 Drawing Sheets

U.S. PATENT DOCUMENTS

| | | |
|---|---|---|
| 5,288,171 | 2/1994 | Smith et al. . |
| 5,314,266 | 5/1994 | Smith et al. . |
| 5,320,450 | 6/1994 | Smith . |
| 5,333,738 | 8/1994 | Fuchs et al. . |
| 5,411,147 | 5/1995 | Bond . |
| 5,429,454 | 7/1995 | Davis et al. . |
| 5,445,330 | 8/1995 | Shokry Rashwan et al. . |
| 5,468,291 | 11/1995 | Waterson et al. .................. 405/129 X |
| 5,525,009 | 6/1996 | Hansen . |
| 5,582,572 | 12/1996 | Bianchi . |
| 5,599,138 | 2/1997 | Kozak et al. . |
| 5,855,664 | 1/1999 | Bielecki et al. ........................ 405/129 |
| 5,857,807 | 1/1999 | Longo ..................................... 405/129 |

PROCESS FOR PRODUCING A PRODUCT FOR USE AS AN ALTERNATIVE COVER MATERIAL FOR LANDFILLS AND SYSTEMS

BACKGROUND OF THE INVENTION

The present invention relates to a process and system for producing an alternative cover for landfills, and more particularly, is directed to an alternative daily cover for landfills using recycled materials which meets the Department of Environmental Protection requirements for a daily cover.

State and federal environmental regulations generally require operators of landfills to periodically cover exposed solid waste, typically at the end of each working day or at the end of every 24 hours. The daily cover is used to prevent vectors, odors, blowing, litter and other nuisances from the landfill and is also required to prevent fires and to allow loaded vehicles to successfully maneuver on landfill after the cover material has been placed. Generally, the layer of cover material is required to be a minimum of 6 inches thick and a supply of the cover must be maintained on site. The cover must also be capable of sustaining vegetation in some states, at least temporarily, prior to receiving a final cover in order to protect against corrosion and sedimentation. The daily cover requirements vary somewhat from state to state, but the material used is generally known in the industry as "daily cover", or "periodic cover" when the interval is more than one day (for example two or three days). As used herein "daily cover" is intended to include both daily and periodic cover for landfills such as municipal solid waste (MSW) landfills, rubble landfills, land clearing debris landfills, and industrial waste landfills.

Generally, each day's solid waste, garbage or other debris which has been placed in the landfill is covered at the end of the day. Further layers of solid waste, garbage and debris are then spread directly on top of the daily cover from the previous day. Typically, landfills use soil as a daily cover, and the soil must be purchased from an outside source and delivered to the landfill site. Due to the high rate of soil consumption as daily cover, this can be a substantial cost item. Moreover, the soil used as a daily cover in the landfill uses a significant amount of the available landfill space which might otherwise be used for receiving solid waste garbage and debris. In view of the fact that landfill capacity is being rapidly exhausted, it would be desirable to reduce the consumption rate of the available landfill volume. It would also be desirable to use recycled material which would otherwise be deposited in landfills as a component of an alternate daily cover material which meets all of the requirements for a daily cover, and can be provided at reduced cost due to the use of recycled materials. This would consume less overall landfill space since the recycled materials would form part of the daily cover as opposed to part of the solid waste or debris which was previously required to be covered.

Landfill operators are also required to provide intermediate cover for areas which will be temporarily dormant, generally for more than 3 or 4 days, but which will eventually be covered with additional solid waste, garbage or other debris. This intermediate cover has similar requirements to daily cover, but is generally required to have a smaller maximum particle size to prevent vectors, odors, litter and other nuisances from the landfill over a longer period of time. It would also be desirable to provide an alternate intermediate cover using recycled materials.

BRIEF SUMMARY OF THE INVENTION

Briefly stated, the present invention provides a process for producing a product for use as an alternative cover material for landfills using recycled materials. The process comprises:

(a) receiving construction and demolition debris in a first area;

(b) receiving clean fill in a second area;

(c) positive sorting at least one of masonry products, concrete, bricks, cinder block, rocks, and asphalt from the construction and demolition debris from the first area;

(d) positive sorting a remaining portion of the construction and demolition debris from step (c) to remove recyclable materials including at least one of cardboard, wood, fiber, ferrous metal and non-ferrous metal;

(e) negative sorting a remainder of the construction and demolition debris from step (d) to remove materials other than wood, roofing material, plaster, plaster board and insulating board to form a first feed stock component;

(f) grinding the first feed stock component to a desired particle size of up to approximately six inches to form a first feed stock;

(g) mixing the at least one of the masonry products, concrete, bricks, cinder block, rocks and asphalt with the clean fill from the second area to form a second feed stock component;

(h) grinding the second feed stock component to a desired particle size of up to approximately six inches to form a second feed stock; and (i) blending the first and second feed stocks in a proportion of approximately 2:1 to approximately 5:1 by weight to form an alternative cover material for landfills using recycled material.

In another aspect, the present invention provides a system for forming an alternative cover material for landfills from a blended combination of a first feed stock comprising a ground mixture of at least one of wood, roofing material, plaster, plasterboard and insulating board recycled from construction and demolition debris, and a second feed stock comprising a ground mixture of at least one of recycled masonry, concrete, bricks, cinder block, rock and asphalt sorted from construction and demolition debris and cleanfill. The system comprises a first grinder adapted to receive and grind at least one of the wood, the roofing material, the plaster, the plasterboard and the insulating board recycled from the construction and demolition debris to produce the first ground feed stock. A first conveyor is provided which is adapted to convey the first ground feed stock from the first grinder to a first measuring device. The first measuring device is adapted to measure a desired amount of the first feed stock. A second grinder is provided which is adapted to receive and grind at least one of the recycled masonry, the concrete, the bricks, the cinder block, the stone and the asphalt sorted from the construction and demolition debris combined with cleanfill to produce a second ground feed stock. A second conveyor is provided which is adapted to convey the second ground feed stock from the second grinder to a second measuring device. The second measuring device is adapted to measure a desired amount of the second feed stock. A mixing chamber is provided which is adapted to receive the first ground feed stock from the first measuring device and the second ground feed stock from the second measuring device in measured proportions and to provide a homogenous mixture of the first and second ground feed stocks to form an alternative daily cover material having generally uniform properties.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
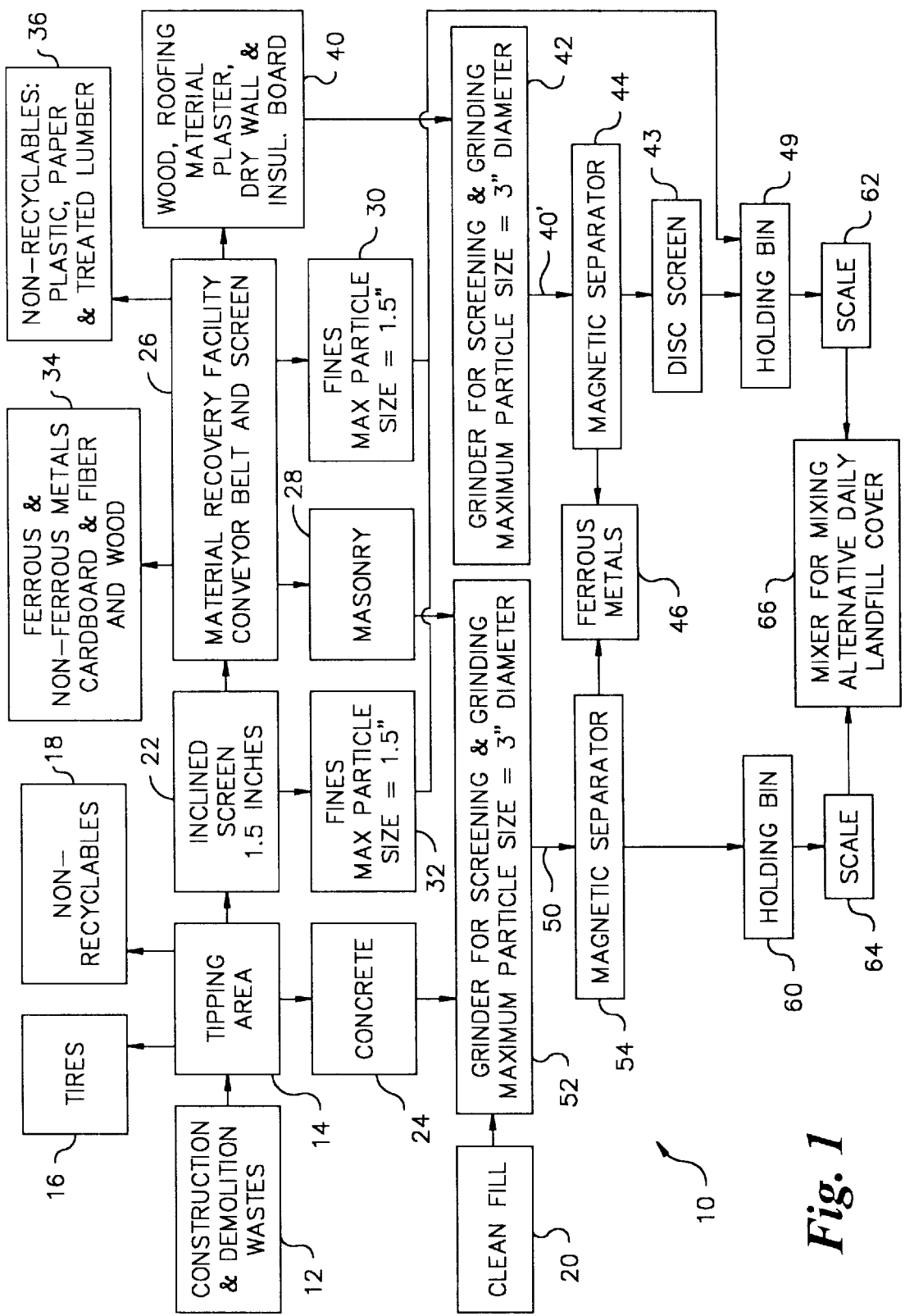
FIG. 1 is a flow diagram showing the processing stages used for recycling the construction and demolition debris into an alternate landfill cover material.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the system for forming an alternative daily cover material 10, and designated parts thereof. The terminology includes the words specifically mentioned above, derivatives thereof and words of similar import.

Referring now to FIG. 1, a flow diagram of the process carried out by a system 10 for forming an alternative cover material for landfills is shown. The system 10 is used in a process for producing a product for use as an alternative daily cover material or intermediate cover for landfills using recycled material. To the extent that the main difference between a daily cover and an intermediate cover is maximum particle size, both types of alternative cover material will be generally referred to as daily cover for the purposes of the present description. However, when the alternative cover material produced by the present invention is to be used as an intermediate cover, it is ground to a maximum particle size of 1 inch or less (generally ½ to ¾ inch), as explained in detail below.

As shown in FIG. 1, the process begins with the delivery of construction and demolition debris, represented by block 12, which is received in a first, tipping area, represented by block 14. The tipping area 14 is preferably a concrete floor where the construction and demolition debris 12 is unloaded such that it can be inspected. Unacceptable materials and loads of material which are suspected to contain chemical or other contamination can be rejected and reloaded on the same vehicle without contaminating the construction and demolition debris 12 which was previously received which has been or is being processed. Additionally, using a concrete surface allows the tipping area 14 to be cleaned on a daily basis as well as preventing potential contaminants from entering the ground. However, it will be recognized by those skilled in the art from the present disclosure that other surfaces could be used for the tipping area 14, if desired.

The accepted construction demolition debris 12 is subjected to a combination of hand and mechanical sorting which includes both positive and negative sorting as described in more detail below. As noted in block 16, tires are presorted from the construction and demolition debris 12 in the tipping area 14 such that they can be recycled or processed separately. Additionally, non-recyclables are preferably sorted from the tipping area as shown in block 18. For example, materials such as rugs and plastic sheets are removed. Other large materials, such as ferrous and nonferrous metals, including structural members from buildings, are preferably removed from the construction and demolition debris 12 in the first, tipping area 14 in order to avoid unnecessarily moving these larger articles through the sorting process.

An additional component of the alternative daily cover material produced by the system 10 is cleanfill 20, such as soil or rock, which is delivered to a second receiving area 20.

The construction and demolition debris 12 from the tipping area 14 is preferably moved over an inclined screen 22, where fine particulate matter ("fines") 32 having a particle size or approximately 1.5 inches or less is screened from the construction and demolition debris 12. This is done to ensure that the fines are not further reduced in size during the grinding and shredding operations which are described below, resulting in a better end product and also reducing the amount of material which can later become air born.

Preferably, masonry products, concrete, bricks, cinder blocks, rocks, asphalt, and other similar materials are positive sorted from the construction and demolition debris 12 as it is carried by a conveyor 26 from the first area 14. Large concrete or other masonry or similar articles 24 may be removed directly from the tipping area 14, and smaller pieces of the concrete and masonry products 28 may be removed by positive sorting from a raised conveyor belt and screen 26. Additional fines 30 may also be removed from the conveyor belt and screen 26 for the reasons noted above. These fines 30 also have a maximum particle size of approximately 1.5 inches, and are moved along with the fines 32 removed from the inclined screen in block 22.

The remaining portion of the construction and demolition debris 12 which is being processed along the conveyor belt and screen 26 is positive sorted to remove additional recyclable materials including at least one of cardboard, fiber, untreated wood, ferrous and nonferrous metals, and other similar desirable materials which are removed and recycled as indicated by block 34. These materials can be removed by manual sorting or at least partially automated sorting, such as magnetic or float tank separation, if desired.

The remainder of the construction and demolition debris 12 is then negative sorted to remove materials other than the remaining wood (which was not determined to be recyclable in the previous step), roofing material, plaster, plasterboard and insulating board. The negative sorting step preferably includes removing at least one of ferrous and nonferrous metals, cardboard, fiber, treated wood, plastics and paper, which are not desirable as a component of the alternative daily cover material. This removes the bulk of combustable material from the remaining material which will be used to form the alternative daily cover material.

The resulting product from the sorted construction demolition debris 12 then consists of wood, roofing material, plaster, plasterboard and insulating board 40 which forms a first feed stock component which may also be referred to as "modified demolition debris".

The first feed stock component 40 is ground by a grinder 42 in a grinding/screening operation to form a first ground feed stock component 40' which can include materials having a particle size of up to approximately 6 inches. Depending upon the particular application, the particle size of the first ground feed stock 40' can be 3 inches or less, as shown in FIG. 1. It will be recognized by those skilled in the art that the particle size of the first feed stock 40' can be larger or smaller, if desired, but generally 6 inches or less is a requirement for an alternative daily cover material for landfills.

In order to ensure that the first ground feed stock 40' has a maximum particle size as approximately 6 inches, the first ground feed stock component is screened using a disc screen 53, and the oversized materials separated from the ground and screened first feed stock 40' are fed back to the beginning of the sorting process to the disc screen 22 for resorting. In order to avoid jamming the grinding equipment, the oversized material separated from the ground and screened first feed stock 40' are preferably remixed in a proportion of 5 percent or less.

The first feed stock 40' which has been screened to eliminate oversized particles, then passes through a magnetic separator 44 where ferrous materials from the first feed stock 40' are removed. The ferrous materials 46 collected from the magnetic separator 44 are preferably recycled. The first feed stock 40' then passes to a holding bin 49 where it is held for further processing.

Either concurrently with or separately from the processing of the first feed stock 40', the at least one of the masonry products, concrete, bricks, cinder block, rocks, asphalt and other similar products 24, 28 are mixed with the cleanfill 20 to form a second feed stock component. The second feed stock component is ground in a grinding apparatus 52 to a desired particle size of up to approximately 6 inches to form a second feed stock 50. Preferably, the second feed stock 50 is screened to make sure that no oversize debris which could not be reduced to the proper size is removed. Since the masonry products, concrete, bricks, cinder block, rocks, asphalt and other similar products 24, 28 and the cleanfill can be reduced to the desired particle size without any difficulty, this screening basically removes any debris which cannot be reduced, which is generally unwanted materials 55, such as plastic, fiber or wood, which are disposed of separately. In a preferred embodiment of the invention, the maximum particle size of the second feed stock is 3 inches. However, it will be recognized by those skilled in the art that larger or smaller sizes can be used, depending upon the particular application. Ferrous materials 46 are then separated from the second ground feed stock 50 using a magnetic separator 54, and the ferrous materials 46 are collected for recycling. The second ground feed stock 50 may also be passed through a screen (not shown) in order to insure that the maximum particle size is less than 6 inches, however, this is generally not required. The second feed stock 50 is fed to a second holding bin 60.

In order to form the alternative daily landfill cover, the first and second feed stocks 40', 50 are removed from the holding bins 49, 60, respectively and are weighed on scales 62, 64, respectively. The first and second feed stocks 40', 50 are provided in a proportion of approximately 2:1 to approximately 5:1 by weight and are blended in a mixer 66 to form an alternative daily cover material for landfills using the recycled construction demolition debris 12. The exact blend can be varied depending upon the resulting properties desired, with the resultant product having a high degree of uniformity in terms of particle size and composition.

It will be recognized by those skilled in the art from the present disclosure that the holding bins 50, 60 can be omitted, if desired, and the production lines for the first and second feed stocks 40', 50 can be run concurrently and the feed stocks 40', 50 can be delivered directly to the scales 62, 64, in order to eliminate the need for stock piling either the first or second feed stock 40', 50. However, as a practical matter, it is necessary to have a supply of both of the first and second feed stocks 40', 50 on hand to make up for shortages of materials coming off of either line, as well as to allow for custom blends of the first and second feed stocks 40', 50 to be made at any given time.

The alternative daily cover material formed by the above process can be applied readily in a compacted 6-inch layer as required by the municipal waste management regulations in many areas in order to isolate municipal waste from contact with vectors. The alternative daily cover material has no odor associated with it and tends to absorb as well as suppress odors associated with municipal waste based on the use of the recycled construction and demolition debris in the alternative daily cover material. The high percentage of crushed concrete, brick, plaster and plasterboard, as well as cleanfill in the alternative daily cover material ensures the durability of the product and allows motor vehicles to successfully maneuver over the alternative daily cover.

Additionally, the alternative daily cover material was found to resist ignition and to act as a fire retardant blanket. In one preferred embodiment, the alternative daily cover material produced by the above-recited process included approximately 70 percent crushed brick, cinder block, plasterboard and dirt, approximately 20 percent wood, approximately 5 percent roofing materials, approximately 4 percent moisture and approximately 1 percent of other miscellaneous materials, such as paper.

For an alternative intermediate cover, the first and second feed stocks 40' and 50 are ground to a maximum particle size of less than 1 inch, and more preferably to a maximum particle size of ½ to ¾ inch, and are blended and mixed in approximately the same proportions as noted above. Oversize particles can be screened off by the disc screen 43, which can be set up to only allow material that is ¾ inch or smaller to pass through, and the oversize material can be reprocessed, as noted above. Preferably, the clean fill used includes a larger soil component as compared to aggregate which would be more desirable for the alternate daily cover material. Clean fill with a large soil content can be kept separate in the clean fill tipping area, and a sufficient amount can be included in the alternative intermediate cover mixture to sustain vegetation.

Figure 2:
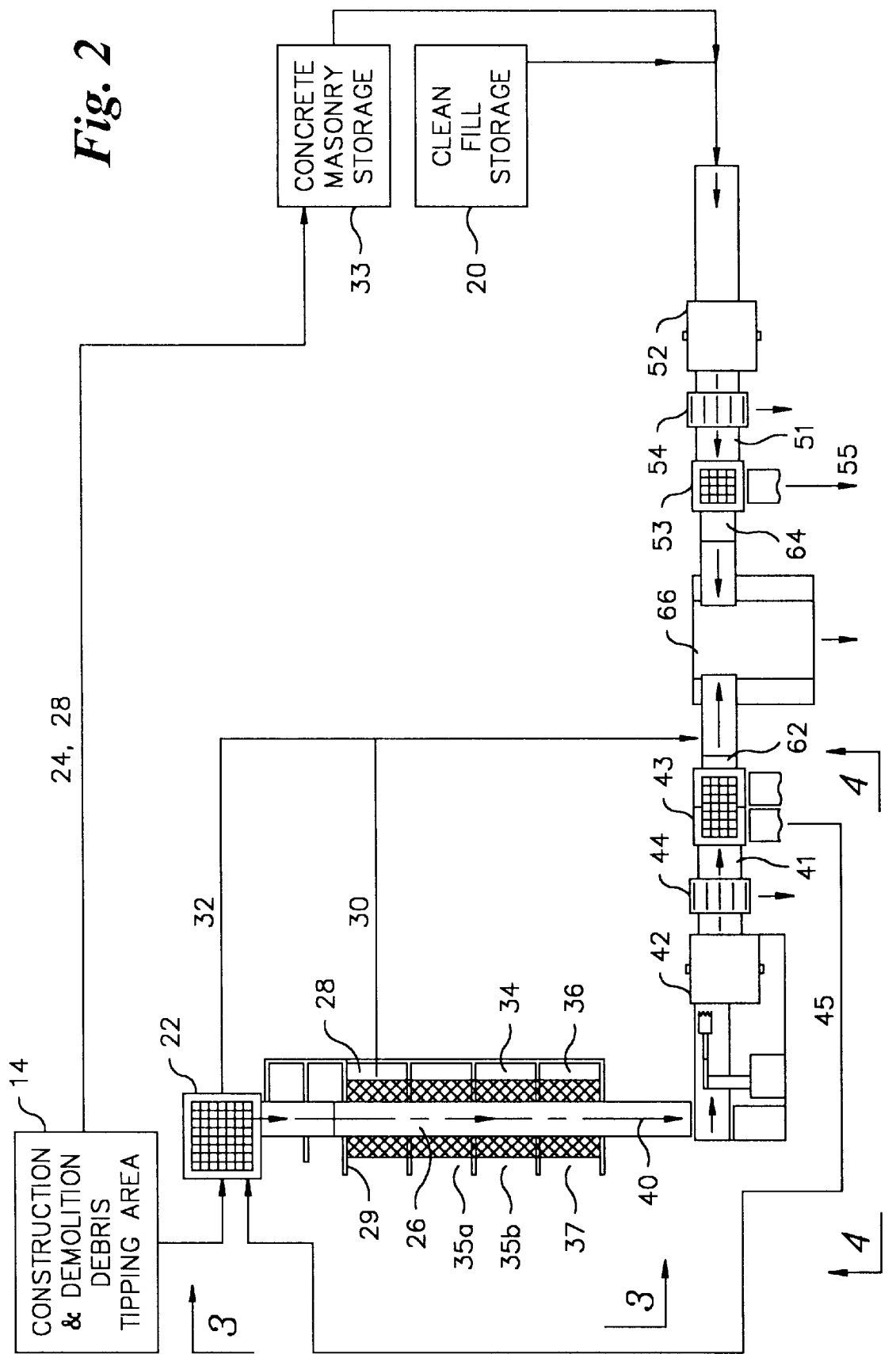
FIG. 2 is a plan view showing a preferred layout of a system for forming an alternative cover material in accordance with the present invention.
Figure 3:
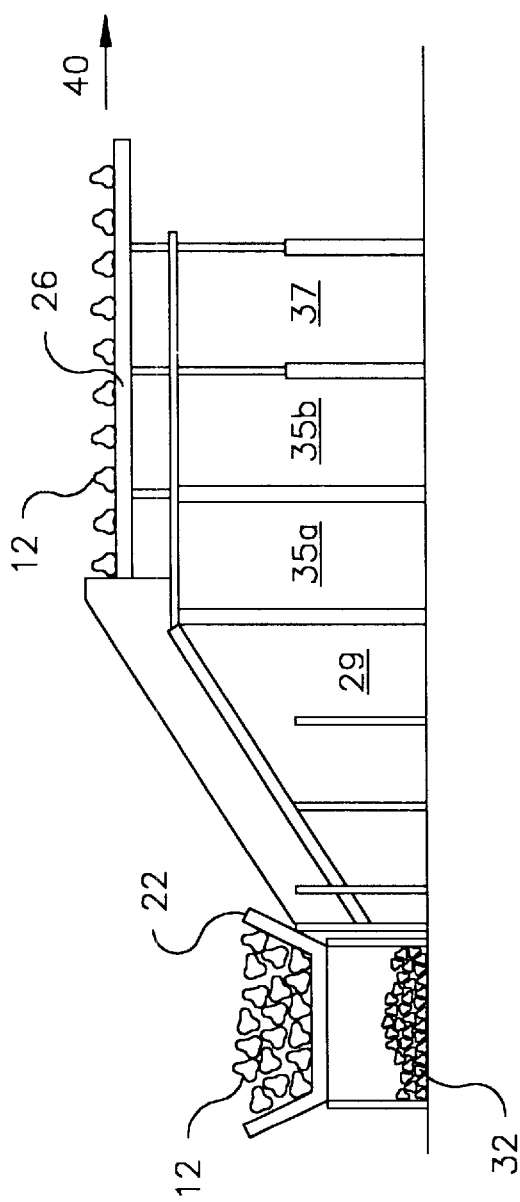
FIG. 3 is an elevational view taken along lines 3—3 in FIG. 2.
Figure 4:
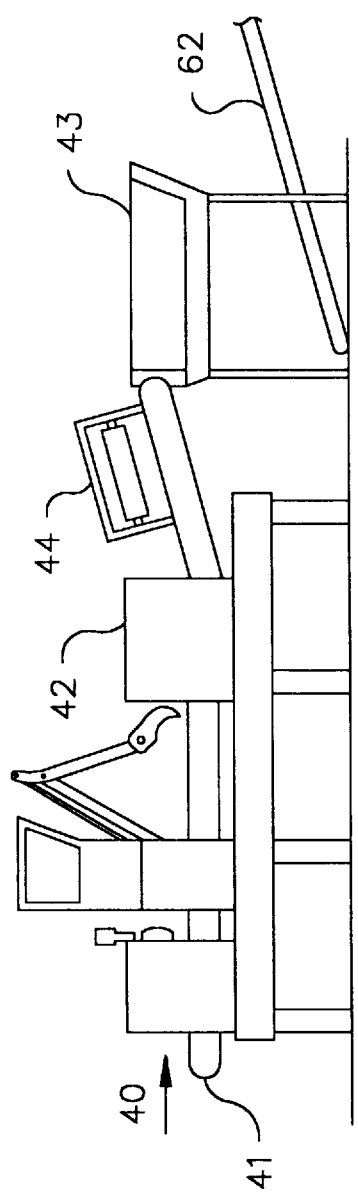
FIG. 4 is an elevation view taken along lines 4—4 in FIG. 2.

Referring now to FIGS. 2–4, a schematic plan view of the preferred system 10 for forming an alternative daily cover material for landfills is shown. The system 10 produces a blended combination of the first feed stock 40' comprising a ground mixture of at least one of untreated wood, roofing material, plaster, plasterboard and insulating board recycled from construction and demolition debris 12, and a second feed stock 50 comprising a ground mixture of at least one of recycled masonry, concrete, bricks, cinder blocks, rock, asphalt and similar materials sorted from the construction demolition debris 12 which are mixed with cleanfill 20.

As shown in FIG. 2, the system 10 includes the tipping area 14 for receiving the construction and demolition debris 12. After the initial sorting of tires, non-recyclables and concrete, the construction and demolition debris 12 is passed to an inclined screen 22, where fines 32 are removed. Such screening devices are generally known to those of ordinary skill in the art. Once such device is a SCREEN ALL, which is available from Read Co. The fine particles which pass through the screening device are conveyed to the first measuring device, which is preferably the scale 62. The fine particles are conveyed using a conveyor, or may be moved using a front end loader or similar equipment.

The inclined screen passes the remaining construction and demolition debris 12 to an elevated conveyor belt and screen 26, shown in FIGS. 2 and 3, which is located over a plurality of bins where sorted materials are discharged, either manually or by automated sorting. For example a bin 29 is provided for masonry products 28, one or more bins 35a, 35b are provided for recyclables 34, and a bin 37 is provided for non-recyclables 36. Preferably, the bins 29, 35a, 35b, 37 are large enough to allow emptying using a front end loader or other industrial equipment. Alternatively, the bins 29, 35a, 35b, 37 may be constructed with conveyor feeds for emptying or may comprise a bin which is hydraulically actuated for dumping.

As shown in FIG. 2, the remaining materials which form the first feed stock component 40 are carried by the conveyor 26 to the first grinder 42 which is adapted to receive and grind at least one of the untreated wood, the roofing material, the plaster, the plasterboard and the insulating board which make up the first feed stock component 40 recycled from the construction and demolition debris 12 to produce the first ground feed stock 40'. Preferably, the grinder 42 is a GRUNDLEN which is available from Simplicity-Grundlen. However, it will be recognized by those skilled in the art that other types of suitable grinding and/or shredding equipment may be used, if desired.

As shown in FIGS. 3 and 4, a first conveyor 41 is adapted to convey the first ground feed stock 40' from the first grinder 42 to a disc screen 43 to insure that the particle size is smaller than a desired maximum particle size. Oversize materials are carried back to the intake for the grinder 42, preferably using a conveyor 45. However, other means for conveying the oversize materials back to the grinder 42, such as a wheel loader, may be used. The first ground feed stock 40' is then conveyed to a first measuring device 62 which is adapted to measure a desired amount of the first ground feed stock 40' to be used in the alternative daily cover material. The first measuring device 62 is preferably a scale of the type generally known to those skilled in the art. Alternatively, the first ground feed stock 40' can be conveyed to a holding bin (not shown) for later use.

A second grinder 52 which is adapted to receive and grind at least one of the recycled masonry, the concrete, the bricks, the cinder block, the stone, the asphalt 24, 28 sorted from the construction and demolition debris 12, as well as cleanfill from storage area 20 is adapted to produce a second ground feed stock 50. The recycled masonry, the concrete, the bricks, the cinder block, the stone, the asphalt 24, 28 can be conveyed directly to the second grinder 52 or may be stored in a concrete/masonry storage area 33.

A second conveyor 51 is adapted to convey the second ground feed stock 50 from the second grinder 52 to a screen 53 in order to insure that the maximum particle size is below a desired maximum size. The oversize material is sent back to the second grinder 52 using conveyor 55. The second ground feed stock 50 is then conveyed to a second measuring device 64. The second measuring device 64 is adapted to measure a desired amount of the second feed stock 50. The second measuring device 64 is also preferably a scale. Alternatively, the second ground feed stock 50 can be conveyed to a holding bin (not shown) for later use.

A mixing chamber 66 is provided which is adapted to receive the first ground feed stock 40' from the first measuring device 62 and the second ground feed stock 50 from the second measuring device 64 in measured proportions and creates a homogenous mixture of the first and second ground feed stocks 40', 50 to form an alternative daily cover material. Fines 30, 32 can also be added to the first feed stock 40' at the scale 62.

As shown in detail in FIG. 2, preferably the first and second magnetic separators 44, 54 are located over the first conveyor 41 and the second conveyor 51, respectively, in order to separate the ferrous materials from the first and second ground feed stocks 40', 50. Preferably, each of the magnetic separators 44, 54 is an OVER BELT magnetic separator, which is available from Dings. However, it will be recognized by those skilled in the art from the present disclosure that other types of magnetic separators may be used, if desired.

The alternative daily cover material can be used to form a road base or an access road base in a land fill, and by using the system in accordance with the present invention, the road base can be formed from pure aggregate or any percentage thereof mixed with the ground modified demolition debris to form a customized mixture.

It will be appreciated by those skilled in the art that changes could be made to the preferred embodiments of the invention described above without departing from the broad inventive concept thereof. For example, the preferred layout and flow of materials through the preferred system could be changed from that disclosed above through different sequencing of the processing events. It is understood, therefore, that this invention is not limited to the particular embodiments disclosed, but it is intended to cover modifications within the spirit and scope of the present invention as defined by the appended claims.

What is claimed is:

1. A process for producing a product for use as an alternative cover material for landfills using recycled material, comprising:
   (a) receiving construction and demolition debris in a first area;
   (b) receiving clean fill in a second area;
   (c) positive sorting at least one of masonry products, concrete, bricks, cinder block, rocks, and asphalt from the construction and demolition debris from the first area;
   (d) positive sorting a remaining portion of the construction and demolition debris from step (c) to remove recyclable materials including at least one of cardboard, ferrous metal and non-ferrous metal;
   (e) negative sorting a remainder of the construction and demolition debris from step (d) to remove materials other than untreated wood, roofing material, plaster, plaster board and insulating board to form a first feed stock component;
   (f) grinding the first feed stock component to a desired particle size of up to approximately six inches to form a first feed stock;
   (g) mixing the at least one of the masonry products, concrete, bricks, cinder block, rocks and asphalt with the clean fill from the second area to form a second feed stock component;
   (h) grinding the second feed stock component to a desired particle size of up to approximately six inches to form a second feed stock; and
   (i) blending the first and second feed stocks in a proportion of approximately 2:1 to approximately 5:1 by weight to form an alternative cover material for landfills using recycled material.

2. The process of claim 1 further comprising:
   screening fine particulate matter having a particle size of approximately 1.5 inches or less from the construction and demolition debris as it is being sorted; and blending the fine particulate matter with the first ground feed stock component from step (f) such that it becomes part of the first feed stock.

3. The process of claim 1 further comprising:

screening the ground second feed stock from step (h) to ensure that the maximum particle size is approximately six inches; and remixing oversize materials separated from the ground and screened second feed stock component with the mixture of step (g).

4. The process of claim 1 further comprising:

screening the first ground feed stock component from step (f) to ensure that the maximum particle size is approximately six inches; and remixing oversized materials separated from the ground and screened first feed stock component with the first feed stock component of step (f).

5. The process of claim 4 wherein the oversized materials separated from ground and screened first feed stock component are remixed with the materials of step (f) in a proportion of 5% or less.

6. The process of claim 1 further comprising:

separating ferrous material from the first and second ground feed stock components using magnetic separators.

7. The process of claim 1 wherein the step of negative sorting the construction and demolition debris in step (e) further comprises:

removing at least one of ferrous and non-ferrous metals, cardboard, fiber, untreated wood, treated wood, plastics and paper.

8. The process of claim 1 further comprising:

presorting large ferrous and non-ferrous materials from the construction and demolition debris in the first area.

9. The process of claim 1 further comprising:

presorting tires from the construction and demolition debris in the first area.

10. A system for forming an alternative cover material for landfills from a blended combination of a first feed stock comprising a ground mixture of at least one of untreated wood, roofing material, plaster, plaster board and insulating board recycled from the construction and demolition debris, and a second feed stock comprising a ground mixture of at least one of recycled masonry, concrete, bricks, cinder blocks, rock and asphalt sorted from construction and demolition debris and clean fill, the system comprising:

a first grinder adapted to receive and grind at least one of untreated wood, roofing material, plaster, plaster board and insulating board recycled from the construction and demolition debris to produce a first ground feed stock;

a first conveyor adapted to convey the first ground feed stock component from the first grinder to a first measuring device, the first measuring device being adapted to measure a desired amount of the first feed stock;

a second grinder adapted to receive and grind at least one of recycled masonry, concrete, bricks, cinder block, stone and asphalt sorted from the construction and demolition debris combined with clean fill to produce a second ground feed stock;

a second conveyor adapted to convey the second ground feed stock from the second grinder to a second measuring device, the second measuring device being adapted to measure a desired amount of the second feed stock;

a mixing chamber adapted to receive the first ground feed stock from the first measuring device and the second ground feed stock from the second measuring device in measured proportions and to provide a homogenous mixture of the first and second ground feed stocks to form an alternate cover material having generally uniform properties.

11. The system according to claim 10 further comprising a screening device having a mesh which is adapted to allow fine particles with a size of approximately 1.5 inches or less to pass through, and a conveying apparatus for conveying the fine particles to the first measuring device.

12. The system according to claim 11 further comprising a conveyor for transporting the construction and demolition debris which does not pass through the mesh of the screening device to a sorting area.

13. The system according to claim 10 further comprising a first magnetic separator adapted to separate ferrous materials from the first ground feed stock located downstream of the first grinder, the first magnetic separator being located over the first conveyor; and a second magnetic separator adapted to separate ferrous materials from the second ground feed stock located downstream of the second grinder, the first magnetic separator being located over the second conveyor.

* * * * *